United States Patent [19]
Vockel, Jr. et al.

[11] Patent Number: 5,935,498
[45] Date of Patent: *Aug. 10, 1999

[54] PROCESS FOR MAKING A TREATED VEIL AND A PRODUCT PRODUCED BY THE PROCESS

[75] Inventors: Richard L. Vockel, Jr., Oak Ridge; Ladson L. Fraser, Jr., Greensboro, both of N.C.

[73] Assignee: Precision Fabrics Group, Inc., Greensboro, N.C.

[*] Notice: This patent is subject to a terminal disclaimer.

[21] Appl. No.: 09/012,013

[22] Filed: Jan. 22, 1998

Related U.S. Application Data

[60] Division of application No. 08/611,458, Apr. 11, 1996, which is a continuation-in-part of application No. 08/080,589, Jun. 24, 1993.

[51] Int. Cl.$^6$ .................................................. B29C 67/00
[52] U.S. Cl. .................... 264/136; 264/134; 264/130; 442/43; 442/58; 442/97; 442/131; 442/133
[58] Field of Search ................................. 264/136, 137, 264/135, 134, 130, 129; 442/43, 58, 97, 131, 133

[56] References Cited

U.S. PATENT DOCUMENTS

| | | | |
|---|---|---|---|
| 2,611,721 | 9/1952 | Brees | 156/310 |
| 4,329,194 | 5/1982 | Green et al. | 156/179 |
| 4,752,513 | 6/1988 | Rau et al. | 428/91 |

FOREIGN PATENT DOCUMENTS

2 152 869  8/1985  United Kingdom.

*Primary Examiner*—Jenna Davis
*Attorney, Agent, or Firm*—Finnegan, Henderson, Farabow, Garrett & Dunner, L.L.P.

[57] ABSTRACT

Disclosed is a veil treated with a resin-affecting compound such as a mold release agent, a UV stabilizer, or a UV absorber for use in fiber reinforced plastic (FRP) parts. Also disclosed is a process for altering the chemical or physical properties of a resin during a production process comprising the steps of: (a) treating a veil with at least one resin-affecting compound, alone or in combination with other resin-affecting compounds; (b) applying the treated veil to a resin; (c) forming an article from said veil and said resin; and (d) curing the article.

15 Claims, 2 Drawing Sheets

PROCESS FOR MAKING A TREATED VEIL AND A PRODUCT PRODUCED BY THE PROCESS

This is a division of application Ser. No. 08/611,458, filed Apr. 11, 1993, which is a Continuation-In-Part of Ser. No. 08/080,589, filed Jun. 24, 1993, all of which are incorporated herein by reference.

BACKGROUND OF THE INVENTION

1. Field of the Invention

This invention relates to a process for altering the chemical or physical properties of a resin during production of a reinforced resin part by applying a treated veil to the resin thereby affecting the resin in the proximity of the treated veil during a production process. More particularly, this invention relates to a process for reducing the pulling force necessary to draw material through a mold during fabrication of a reinforced resin article, and to a process for improving the durability of a reinforced resin article when exposed to ultraviolet (UV) light. This invention also relates to the treated veil and to reinforced resin parts made with the treated veil.

2. Description of the Related Art

Fiber reinforced plastic (FRP) structural parts have been successfully used in various applications where the part is subjected to corrosive decay, decomposition, rust, and degradation, such as in chemical plants, paper mills, and plating facilities. These FRP parts are used to replace conventional parts made of, e.g., steel, aluminum, and wood, when there are maintenance problems associated with corrosive environments, or other environments which are not conducive to using conventional parts.

FRP parts or articles can be made by a number of processes, including, but not limited to, the following processes.

Pultrusion is a process for fabricating a reinforced resin product, such as a fiber reinforced plastic (FRP) article. It involves taking various forms of fiber reinforcements (mats, woven products, continuous rovings, etc.) made of materials such as fiberglass, carbon, aramid, etc. which are saturated or wet-out with an uncured thermoset resin. Normally, a polyester resin is used, but it can also be epoxy, phenolic or other resins. These saturated reinforcements are then pulled through a heated, matched metal die or mold machined to the shape of the desired finished part. While in the die or mold, the time and temperature relationship of the die or mold to the resin formulation transforms the resin from a liquid to a solid. This transformation is known as curing, cross-linking or polymerization. During this transformation, exothermic energy is generated in the chemical reaction.

In the pultrusion process, the amount and type of reinforcement to obtain the desired product is first determined. The reinforcement is put in the proper position and held in that position so that a uniform distribution of reinforcement in the resin is achieved. This is accomplished by using the proper amount of tension on the reinforcement along with guiding the reinforcement. If the reinforcement is not uniformly distributed throughout the cross-section of the resin, the finished product could possess areas of structural weakness.

Next, the reinforcements must be saturated or wet-out with a resin in, e.g., the resin tank. Preferably, all of the reinforcements must be wet-out to insure that a quality product is obtained. Viscosity, residence time, and mechanical action are all variables which influence the wet-out process. Without uniform and adequate wet-out, certain areas of the product may be structurally deficient.

Preformers can be used to manipulate the combination of reinforcement and resin in order to reduce die wear and insure uniformity. The combination of reinforcement and resin is then pulled through heated steel dies. Curing occurs during this step of the pultrusion process. Die temperature, pull speed, and the type of catalysts and cure promoter are all variables which control the rate of curing during formation of the product in the dies. The pull speed remains constant during the pultrusion process. Different shapes will require different speed settings.

The finished pultrusion product is then cut to the desired size. The resulting product possesses outstanding strength to weight ratio. See FIG. 1 for a schematic design of a typical pultrusion process.

Contact molding or open molding are other FRP processes. Resins and reinforcements are manually (hand lay-up) or mechanically (spray-up) deposited on an open mold surface. The mold surface is preferably previously coated with a gel coat and is provided with a surfacing veil such as a mat or fabric. Once the required amounts of reinforcements and resin have been deposited on the mold, the laminate is worked with rollers, brushes or squeegees, usually manually, to remove any trapped air and to thoroughly saturate or wet-out the reinforcements with resin. Once this is completed, the laminate is allowed to cure, normally at ambient temperature.

Resin transfer molding (RTM) and structural reaction injection molding (S-RIM) are two similar closed mold FRP processes in which the required reinforcement package, including a surfacing veil such as a mat or fabric, is placed on one-half of the mold cavity, usually the bottom half. Once properly positioned, the top half of the mold is closed on the bottom half and secured in place. Next, the resin is injected slowly under minimal (e.g. 50 psi) pressure in RTM or rapidly under high pressure (e.g.2000 psi) in S-RIM. The mechanical pumping and resulting pressure cause the air to be flushed out of the mold cavity and the resin to saturate or wet-out the reinforcement. The resin impregnated reinforced article is then allowed to cure.

Compression molding is also an FRP mold process. In this process, the reinforcement package including surfacing veil (mat(s) or fabric(s)) and the resin are placed on one-half, usually the bottom half, of the mold cavity. Once properly positioned, the top half of the mold is mechanically closed on the bottom half using a press which compresses the reinforcement package and resin under pressure (from 50 to 1500 psi) to flush out the air and thoroughly saturate or wet-out the reinforcement package with resin. It is then cured normally with the assistance of heat.

Filament winding is an FRP process in which reinforcements, normally continuous rovings, are saturated with resin, normally by pulling them through a pan or bath containing the resin. The reinforcements are then wound on a rotating mandrel in a specific pattern. The mandrel may or may not have been previously covered with a resin impregnated surfacing veil. One or more outer layers of surfacing veil may be wrapped over the resin impregnated reinforcement when required. Once the required amount of resin, reinforcements and surfacing veils are properly placed on the mandrel, the laminate is allowed to cure with or without the assistance of heat.

The continuous panel process is an FRP process for making continuous flat and/or shaped, e.g., corrugated, panels. It involves depositing a resin on a carrier film which then passes under a reinforcement deposition area. Various types of reinforcement are then applied to the film or resin. The reinforcement and resin then go through a compaction section where a series of belts, screens, or rollers force air out and thoroughly saturate or wet-out the reinforcement with resin. A surfacing veil such as a mat or fabric may be placed on either the top or bottom surface of the resulting saturated material and the veil is allowed to be saturated with resin. A carrier film is then applied to the top surface of the resulting article which is passed through a curing station where the resin cures normally with the assistance of heat. Once cured, the carrier film is removed and the article is cut to the desired length.

A publication of Fiberglas Canada, Inc. entitled "An Introduction to Fiberglas-Reinforced Plastics/Composites" provides a detailed overview of FRP production. The teachings of this publication are hereby incorporated by reference into this application.

Mold-release agents may used to prevent molded FRP parts from sticking to mold surfaces. Mold-release agents may be classified as internal or external, depending upon the method of their use. Internal additives are added directly to the resin, while external additives are applied directly to the mold surfaces. Presently, the use of external additives is much greater than the use of internal additives. Mold-release agents are further discussed in the 1994 edition of the Modern Plastics Encyclopedia, herein incorporated by reference. External mold additives are generally combined with solvents and propellants that are used to apply the additives to the mold surface. Use of organic materials as solvents and propellants can lead to environmental problems. For example, chlorinated fluorocarbons (CFCs) have traditionally been used as propellants in external mold-release agents. However, emissions concerns have led to the prohibition of the use of CFCs as propellants. Likewise, more stringent controls on the emissions of volatile organic compounds (VOCs) have led to a desire to reduce their use in mold-release applications.

UV stabilizers and UV absorbers are used in FRP articles to prevent degradation due to the action of UV light on UV sensitive materials in the FRP articles. UV absorbers, such as benzophenone-based materials, may act by absorbing the UV light, and thus preventing the light from reacting with, for example, the resin in the FRP article. UV stabilizers such as hindered amine light stabilizers (HALS), do not directly absorb the UV light, but rather may stabilize the resin by absorbing free-radicals created by the UV light. UW stabilizers and UV absorbers are further discussed in the 1994 edition of the Modern Plastics Encyclopedia, herein incorporated by reference.

Cure promoters are often added in FRP processes. Resin reactivity in FRP processes is controlled by a wide variety of properties. The base resin, as supplied by the resin manufacturer, will vary in reactivity based on formulation, viscosity, temperature in storage, age, etc. The curing of a resin is based on cross-linking the individual molecules to form long chain molecules. Cross-linking can be achieved by the use of a catalyst and/or heat. The rate of cross-linking is determined by how fast the catalyst disassociates into free radicals of active oxygen, which initiates the cross-linking.

The catalyst's rate of disassociation into free radicals can be controlled by heat and/or promoters. It is possible to reduce curing time and/or heating requirements for the manufacture of resin materials by adding a promoter to the resin and curing agent. More heat and/or promoter results in more free radicals, faster cross-linking, faster cure and higher exotherm temperatures. This produces faster cure and faster line speeds. Too high an exotherm temperature, however, causes the finished part to be structurally weaker.

SUMMARY OF THE INVENTION

Disclosed is a process for selectively delivering a composition effective to alter the chemical or physical properties of a resin during a production process comprising the steps of: treating a veil with resin-affecting compounds including a mold release agent, an ultraviolet stabilizer, an ultraviolet absorber, or combinations thereof; applying the treated veil to the resin thereby affecting the resin in the proximity of the treated veil; forming an article from the resin and the veil; and curing the article.

In one embodiment of the invention, the article may contain a reinforcement, wherein the reinforcement may be fiberglass, carbon or aramid, and may be in the form of a mat, a woven product, or chopped or continuous rovings.

The present invention further relates to a process wherein the veil is treated by (1) dipping the veil in a solution containing a resin-affecting compound; (2) nipping the veil; and (3) drying the veil.

The present invention additionally relates to a process wherein the veil is treated by gravure printing of a resin-affecting compound onto the veil.

The FRP processes in which the claimed invention is of use include pultrusion, contact molding, open molding, resin transfer molding, reaction injection molding, compression molding and continuous panel processes.

Another aspect of the invention disclosed herein is a veil for use in manufacturing of fiber reinforced plastics, comprising a veil treated with at least one resin-affecting compound. The resin-affecting compound may be a mold release agent, an ultraviolet stabilizer, or an ultraviolet absorber.

Yet another embodiment is disclosed as being a treated veil incorporated in a fiber reinforced plastic part.

In one aspect of the present invention, a veil may be treated with a resin-affecting compound(s) such as a mold release agent, a UV stabilizer, or a UV absorber. Additionally, a cure promoter may be applied alone or with other resin-affecting compounds as disclosed in co-pending U.S. application Ser. No. 08/080,589, herein incorporated by reference. The veil may be treated with the resin-affecting compound or compounds by methods including: (a) Froth Finishing (foam coating), (b) Foam Coating—Stabilized System, (c) Coating of a Thickened Paste with Knife, Screen, or Gravure Applicator, (d) Printing of a Thickened Paste, (e) Vacuum Extraction—Low Wet Pick-Up Finishing System, (f) Steam Box Application, (g) Spray Finishing—Low Wet Pick-Up, (h) Horizontal Pad, (i) Kiss Roll Applicator, or similar techniques.

The treated veil may then be dried. Drying can be accomplished by: (a) Cans (steam), (b) Palmer Unit (steam), (c) Pin Tenter Curing Oven (forced air), (d) Clip Curing Oven (forced air), (e) Infrared Drying Oven (calrod or gas), (f) Radio Frequency Dryer, (g) Conveyor ovens, or similar techniques.

Among the veils which can be used in the present invention are woven, knit, or non-woven veils. Preferred veils include polyester fabrics, nylon spunbond fabrics, glass fabrics, aramid fabrics, and rayon fabrics. Particularly preferred veils are spunlaced apertured and non-apertured polyester fabrics and spunbonded non-apertured polyester fabric.

Polyester (or other base products such as glass, nylon, etc.) veils that may be used in the fiber reinforced plastic processes described above cause the surface of an FRP article to be "resin rich." That is, the makeup on the surface of a veiled FRP article, for example, an article possessing a treated veil on its surface, is about 90% resin (or resin mixture) and about 10% reinforcement by weight. The composition below the surface of a treated veiled article or on the surface of a nonveiled article would range from 70% resin (or resin mix) and 30% reinforcement, to 30% resin and 70% reinforcement (other than some small amounts of binder resin for dimensional stability in some but not all veiled articles).

Various resins, preferably molding resins, may be used in the practice of this invention. Resins particularly preferred in the present invention include polyester resins, epoxy resins, vinyl ester resins, and phenolic resins.

The present invention facilitates the release of FRP articles from molds by reducing the pulling force necessary to pull the materials through the mold during fabrication of a reinforced resin article. It also may reduce or eliminate the need to add a mold release agent directly to the resin. Such reduction or elimination of added mold release could lead to improved strength of the resulting parts.

Veils treated with a mold release agent according to the present invemold, furteases the lubrication at the surface of the mold, further reducing adhesion between the resin being molded and the mold. The mold release agent may leach from the treated veil into the resin permeating and surrounding the treated veil, thereby increasing lubricity and reducing the pulling force necessary to open the mold.

The concept of applying a veil treated with a mold release agent to a resin during the production of a fiber reinforced plastic article could lead to a variety of benefits in the fabrication of FRP parts. These include but are not limited to, lower cost (because the mold release agent is only applied to the area that is in contact with the mold), reduced production surface defects such as scaling, flaking and porosity (because a higher level of internal mold release can be concentrated in the area that is in contact with the mold), and improved part strength (since the mold release agent would be on or close to the surface of the article and not in the core area of the article, where the mold release agent would act to reduce the strength of the reinforcement-resin bond).

Additionally, the use of a mold release treated external veil may allow for the manufacturing of complex designs on already existing equipment. Complex FRP designs often require more pulling force than simpler designs. If the pulling force required exceeds that obtainable from existing equipment, then a manufacturer may be forced to purchase expensive new machinery for that specific complex design. Use of the mold release treated external veil eliminates or reduces the cost of new equipment by potentially reducing pulling forces to the point that new equipment purchases are unnecessary.

The present invention also facilitates improvements in UV resistance, weatherability, erosion, and color fastness of FRP parts by delivering UV stabilizers and UV absorbers to the resin in proximity to the treated veil.

Veils treated with UV stabilizers and UV absorbers in accordance with the present invention provide the above improvements, most particularly when the UV stabilizers and UV absorbers leach from the treated veil into the resin permeating and surrounding the treated veil, thereby providing protection for the resin against exposure to UV light.

The present invention also relates to products produced by the processes described above, for example products incorporating the treated veils.

These and other features and advantages of the present invention will be made more apparent from the following description of the preferred embodiments or may be learned by practice of the invention.

DESCRIPTION OF THE PREFERRED EMBODIMENTS

The claimed invention relates to a process for selectively delivering a composition effective to alter the chemical or physical properties of a resin during a production process comprising the steps of: treating a veil with resin-affecting compounds including a mold release agent, an ultraviolet stabilizer, an ultraviolet absorber, or combinations thereof; applying the treated veil to the resin thereby affecting the resin in the proximity of the treated veil; forming an article from the resin and the veil; and curing the article.

Mold release agents that may be used in the practice of this invention include: stearic acids and related compounds (such as stearates, stearyl ethers, stearoamides); propylene glycols; dipropylene glycols; Carbowax® series compounds (such as polyethylene glycols; and methoxypolyethylene glycols)(Carbowax® is a trademark of Union Carbide Co.); castor oil;, ethoxylated castor oil; tallow and related compounds (such as hydrogenated tallow amides, and sulfonated tallows; amide waxes; vegetable oils; paraffin; microcrystalline waxes; high density polyethylene; fatty acid derivatives (such as glycerides and triglycerides); poly(quaternary ammonium chlorides; alcohol phosphates (such as those available from Du Pont® as Zelec® UN) and salts thereof (such as those available from Du Pont® as Zelec® NE); compositions of organic acid derivatives, organic phosphate esters and modified fatty acids (such as those available from Technick Products® as Tech-Lube® 250 WS, Tech-Lube® 909-WS, Poly-Blend® 707-WS-R, and Tech-Lube® 100-WS); blends of synthetic resin, organic esters and co-polymers of fatty acid derivatives (such as those available from Technick Products® as Tech-Lube® 707-WS); aqueous emulsions of glycerides and organic acid derivatives with wetting agents (such as those available from Axel Plastics Research Laboratories as Mold-Wiz® INT-EM39/50); aqueous emulsions of a condensation product of synthetic resins, glycerides and organic acid derivatives with wetting agents (such as those available from Axel Plastics Research Laboratories as Mold-Wiz® INT-EM-FR50); mixtures of primary, secondary fatty amines with copolymers of organic phosphate esters and fatty acids (such as those available from Axel Plastics Research Laboratories as Mold-Wiz® INT-#1, and Mold-Wiz® INT-PS125); aqueous emulsions of organic acid derivatives with wetting agents (such as those available from Axel Plastics Research Laboratories as Mold-Wiz® INT-WS1890); and other water-dispersable mold release agents that one of ordinary skill would find suitable.

Preferred mold release agents include: alcohol phosphates and salts thereof; compositions of organic acid derivatives, organic phosphate esters and modified fatty acids; blends of synthetic resins, organic esters and co-polymers of fatty acid derivatives; aqueous emulsions of glycerides and organic acid derivatives with wetting agents; aqueous emulsions of a condensation product of synthetic resins, glycerides and organic acid derivatives with wetting agents; mixtures of primary, secondary fatty amines with copolymers of organic phosphate esters and fatty acids; and aqueous emulsions of organic acid derivatives with wetting agents.

Particularly preferred mold release agents that may be used to practice this invention are: alcohol phosphates and their salts thereof; and aqueous emulsions of organic acid derivatives with wetting agents.

In general, it is desired to treat the veil with an amount of mold release effective to prevent the formed article from sticking to a mold surface. In a preferred embodiment, the treated veil contains up to 24% by weight on the veil of mold release.

UV absorbers that may be used in the practice of this invention include any UV absorbers acceptable to one of ordinary skill, including benzophenones and benzophenone derivatives, PABA and PABA derivatives, benzotriazoles and benzotriazole derivatives, triazines and triazine derivatives and cinnamates and cinnamate derivatives. Preferred UV absorbers that may be used to practice this invention include: 2(2'-hydroxy-5-methyl phenyl) benzotriazole (available from Ciba-Geigy® as Tinuvin® P Paste), 2-(3'-tert butyl-2'-hydroxy-5' methyl phenyl)-5-chlorobenzotriazole (available from Ciba-Geigy® as Tinuvin® 326 Paste), and a mixture of Poly(oxy-1,2-ethanediyl)-α-[3-[3-(2H-benzotriazol-2-yl)-5-(1,1-dimethylethyl)-4-hydroxyphenyl]-1-oxopropyl]-ω-[3-[3-(2H-benzotriazol-2-yl)-5-(1,1-dimethylethyl)- 4-hydroxyphenyl]-1-oxopropoxyl]with Poly(oxy-1,2-ethanediyl)-α-[3-[3-(2H-benzotriazol-2-yl)-5-(1,1-dimethylethyl)-4-hydroxyphenyl]-1-oxopropyl]-ω-hydroxy-polyethylene glycol (available from Ciba-Geigy® as Tinuvin® 1130).

UV stabilizers that may be used in the practice of this invention include UV stabilizers acceptable to one of ordinary skill in the relevant art, including hindered amine light stabilizers (HALS) and HALS derivatives, and benzoates and benzoate derivatives. Preferred UV stabilizers that may be used to practice this invention include: a mixture of bis(1,2,2,6,6-pentamethyl-4-piperidinyl)sebacate and methyl 1,2,2,6,6-pentamethyl-4-piperidinyl sebacate (available from Ciba-Geigy® as Tinuvin® 292 SD).

In general, it is desired to add to the veil an amount of UV absorber and/or stabilizer effective to prevent degradation due to the action of UV light on UV sensitive materials in the formed article. In a preferred embodiment, UV absorber (s) and/or stabilizer(s) are added in an amount of 26% or less by weight on the veil.

Preferred veils for use as a substrate in this invention include Nexus® and Reemay®.

Nexus® is a spunlaced apertured or non-apertured polyester fabric used as a veil in the fabrication of a fiberglass reinforced plastic (FRP) article, specifically a part. It is used to provide a resin-rich surface for the purpose of enhancing the appearance or improving the corrosion resistance of the finished FRP article or part.

Reemay® is a spunbonded non-apertured polyester fabric used as a veil in the fabrication of FRP parts. It is used much the same as Nexus® to provide a resin-rich surface for the purpose of enhancing the appearance or improving the corrosion resistance of the finished FRP part.

These and other features of the present invention are additionally illustrated in connection with the following Examples, which are to be considered as illustrative of the present invention. It should be understood, however, that the invention is not limited to the specific details of the following Examples.

EXAMPLE I

A mold release treated veil was prepared by dipping a fabric in a solution containing a mold release. The treated veil was then dried in an oven.

The following non-woven fabrics were used:

1. Nexus® 039-10 and Zelec UN Mold Release (Nexus® MR)
2. Reemay® 2014 and Zelec UN Mold Release (Reemay® MR)
3. Reemay® 2014 Control (Reemay® control) Veils 1 and 2 were dipped into the following solution:

| PRODUCT | ACTIVITY | DESCRIPTION | DRY PARTS | WET PARTS |
|---|---|---|---|---|
| WATER | — | CARRIER | — | 95.35 |
| DU PONT ZELEC UN | 100% | MOLD RELEASE AGENT | 4.5 | 4.5 |
| NUTEX NUANTIFOAM NS | 42% | DEFOAMER | 0.042 | 0.10 |
| CIBA-GEIGY ALBATEX FFC | 31% | DEFOAMER/DEAERATOR | 0.0155 | 0.05 |

Veils 1 and 2 were nipped to the following percentage of wet pick up.

Solids Weight of Product on Fiber

|  | ACTUAL LAB WET PICK-UP | PRODUCTON WEIGHT OF FIBER |
|---|---|---|
| 1) 039-010 Nexus ® WITH MOLD RELEASE | 133% ± 10% | 6.0% ± 0.4% |
| 2) Reemay ® 2014 WITH MOLD RELEASE | 166% ± 10% | 7.5% ± 0.4% |

Veils 1 and 2 were then dried and heat-set at 400° F. in a tenter frame oven for thirty seconds.

Figure 1:
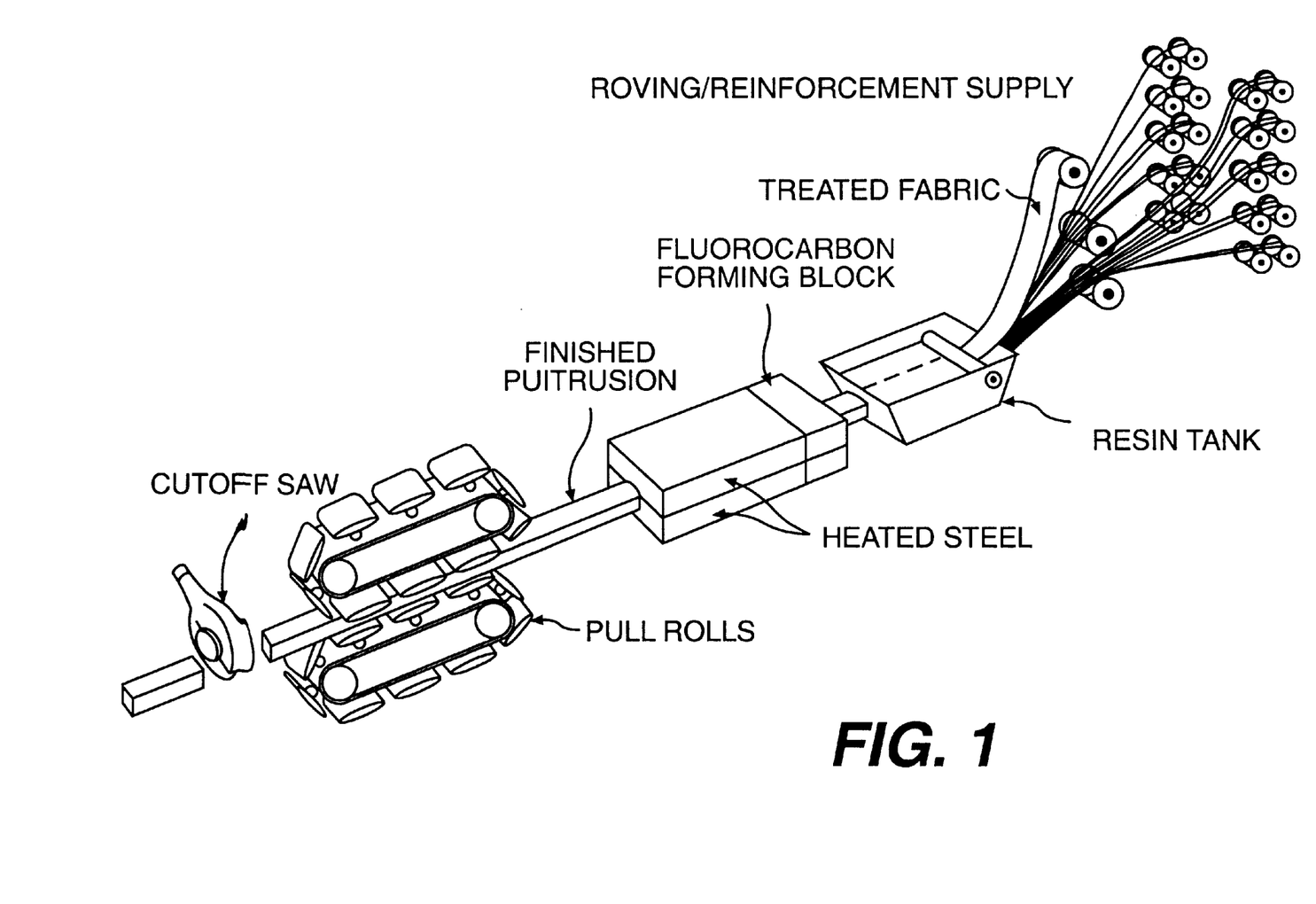
FIG. 1 is a schematic design of a typical pultrusion process.

The treated veils and the control veils were then added to the saturated reinforcement and resin package in the pultrusion process just prior to the entrance of the reinforcement and resin package into the mold (see FIG. 1). The resin in the experiments described below also had two formulations, control resin with mold release and trial resin without mold release.

|  | Ctrl. Mold. resin | Trial Mold. resin |
|---|---|---|
| Resin | 350 Lbs. | 350 Lbs. |
| Filler | 82.2 Lbs. | 82.2 Lbs. |
| Pigment (Orange) | 9.0 Lbs. | 9.0 Lbs. |
| UV Stabilizer | 0.7 Lbs. | 0.7 Lbs. |
| Catalyst | 5.2 Lbs. | 5.2 Lbs. |
| Styrene | 10.0 Lbs. | 10.0 Lbs. |
| Mold Release | 2.S Lbs. | — Lbs. |

The treated and control veils were combined with the control and trial resins in eight different combinations. The pulling force necessary to draw the reinforcements and resin through the mold in each of the eight trials is given below. Results:

| Veil and Resin | Pulling Force |
|---|---|
| 1. Control Resin Reemay ® 2014 | 3000–3200 Lbs. - Av. 3100 Lbs. |
| 2. Control Resin Top Reemay ® 2014 Bottom Reemay ® MR | 2850–2950 Lbs. - Av. 2900 Lbs. |
| 3. Control Resin Top and Bottom Reemay ® MR | 2600–2900 Lbs. - Av. 2800 Lbs. |
| 4. Control Resin Top and Bottom Nexus ® MR | 2700–2850 Lbs. - Av. 2800 Lbs. |
| 5. Trial Resin Top and Bottom Nexus ® MR | 3400–3700 Lbs. - Av. 3500 Lbs. |
| 6. Trial Resin Top and Bottom Reemay ® MR | 3200–3500 Lbs. - Av. 3400 Lbs. |
| 7. Trial Resin Top Reemay ® MR Bottom Reemay ® 2014 | 4600–4800 Lbs. - Av. 4700 Lbs. |
| 8. Trial Resin Top and Bottom Reemay ® 2014 | 5900–6100 Lbs. - Av. 6000 Lbs. NOTE: Pull force went to over 6000 pounds within five minutes. Puller slippage was occurring and the line was threatening to break out, trial was stopped after approximately seven minutes. |

The pulling force necessary to draw the reinforcements and resin through the mold was decreased when a mold release treated veil was used with a resin containing mold release (Trial 2). The pulling force necessary to draw the reinforcements and resin through the mold decreased even more when a mold release treated veil was applied to both sides of a part with a resin containing mold release (Trials 3 and 4). When the trial resin containing no mold release was used with a mold release treated veil, the pulling force increased slightly (Trials 5 and 6) but was close enough to the control force (Trial 1) to be both mechanically and economically acceptable—the minor expenses of increased energy being offset by the savings obtained by not adding large amounts of mold release to the resin.

When, however, the trial resin containing no mold release and only one top treated veil was used, the pull force rose substantially but constant pull force could be maintained (Trial 7). In Trial 8, the trial resin containing no mold release was used with an untreated veil and the force necessary to draw the reinforcements and resin through the mold was so great that the puller could not smoothly draw the reinforcements and resin through the mold.

The results of the trials show that the veil treated with a mold release agent affected the release of the resin on the surface of a molded part. When the resin also contained a mold release agent, as in test panels 3 and 4, the pull force necessary to draw the reinforcements and resin through the mold was reduced. When the resin contains no mold release agent, as in test panels 5 and 6, the force necessary to draw the reinforcements and resin through the mold was marginally increased.

Test plaques from trials 1, 5, and 6 were then subjected to us strength tests, with the following results.

Tensile Strength and Modulus:
Performed according to ASTM D 638: Test condition= Dry; length=1.00 in.; Load range=10000.00 lb. Results based on n=5 sample.

| | [STRESS] psi*103 | | [MODULUS] psi*106 | | [YIELD STRAIN] % | |
|---|---|---|---|---|---|---|
| TRIAL NO. | AVG | STD DEV | AVG | STD DEV | AVG | STD DEV |
| 1 | 81.970 | 3.602 | 4.946 | 0.170 | 1.794 | 0.097 |
| 5 | 85.680 | 5.703 | 5.008 | 0.269 | 1.828 | 0.117 |
| 6 | 90.340 | 2.953 | 5.112 | 0.148 | 1.927 | 0.130 |

Flexural Properties
Performed according to ASTM D 790: Test conditions=A/R; Span=2 in.; Crosshead speed=0.5 in./min.; Full Scale Range=500 lbs. Results based on n=5 sample.

| | [STRESS] psi*103 | | | [MODULUS] psi*106 | | |
|---|---|---|---|---|---|---|
| TRIAL | AVG | STD DEV | 95% CL | AVG | STD DEV | 95% CL |
| 1 | 88.38 | 3.027 | 3.76 | 2.90 | 0.05 | 0.06 |
| 5 | 95.83 | 5.207 | 6.46 | 3.02 | 0.13 | 0.16 |
| 6 | 93.96 | 2.910 | 3.61 | 2.99 | 0.09 | 0.12 |

Compressive Stress and Modulus:
Performed according to ASTM D 695.

| TRIAL NO. | LOAD (LB) | STRESS (PSI*103) | MODULUS (PSI*106) |
|---|---|---|---|
| TRIAL 1 | | | |
| MEAN | 2943 | 64.53 | 4.696 |
| STD. DEV. | 255 | 7.01 | 0.18 |
| TRIAL 5 | | | |
| MEAN | 3140 | 67.81 | 4.669 |
| STD. DEV. | 243 | 5.59 | 0.1 |
| TRIAL 6 | | | |
| MEAN | 3159 | 66.65 | 4.664 |
| STD. DEV. | 216 | 4.90 | 0.366 |

In-plane Shear Stress:
Performed according to ASTM D 3846.

| TRIAL | STRESS (PSI*103) | | |
|---|---|---|---|
| NO. | MEAN | S.D. | C.V. |
| 1 | 5.382 | 0.498 | 9.25 |
| 5 | 5.855 | 0.540 | 9.22 |
| 6 | 5.753 | 0.771 | 13.40 |

As can be seen from the above data, the part according to the invention was stronger than the control part. The part according to the invention was also cheaper than the control part, due to decreased requirements for expensive internal mold release compounds. Improved strength can be seen, for example, in the test results for flexural modulus. The flexural modulus results show a significant improvement in the test panel according to the invention versus control. Thus, elimination of internal mold release coupled with mold release treated external veils results in composites with improved strength properties, such as flexural stress.

EXAMPLE II

The test veils were prepared as follows. All veils used in this experiment were Nexus® 111-010, made from heat set apertured Sontara® from Du Pont® at 1 oz./sq. yard.

The test veils were coated by rotogravure coating. The 24-inch wide rotogravure coater used for this Example included a scrolled roll set to deliver 5 pounds of compound per ream of greige veil (8.82 g/sq. meter), a doctor blade to control register of the compound on the scrolled roll, a pan to apply material to the scrolled roll, a rubber pressure roll to bring the veil substrate in contact with the scrolled roll, drives set to an application speed of 6–8 meters per minute, and a take-up roll to batch the printed material.

A first veil, used for test panels 2, 5, and 8, was coated with Tinuvin® 1130 (appearance viscous liquid at room temperature, 100% solids) by the rotogravure coater to a coating weight of 0.029 oz./ft.$^2$ to form the "UVA" veil.

A second veil, used for test panels 3, 6, and 9, was coated with a 50/50 mixture by weight of Tinuvin® 1130 and Tinuvin® 292 (appearance of mixture: viscous liquid mixture at room temperature, 100% solids) by the rotogravure coater to a coating weight of 0.029 oz./ft.$^2$ to form the combination (eg. "Comb.") veil.

The third, or control, veil was of uncoated Nexus® 111-010, and was used for test panels 1, 4, and 7.

Three resin compositions were prepared. The base resin formulation (eg. "none" in Table 1), used for test panels 1, 2, & 3, was compounded according to the following recipe:

| | |
|---|---|
| isophthalic polyester resin (Reichhold Dion ® 31029) | 80 parts |
| polyvinyl acetate low profile additive (Union LP40) | 20 parts |
| calcium carbonate filler (Camel white grade) | 25 parts |
| styrene | 1 part |
| initiator #1: Di(4-tert-butyl-cyclohexal) peroxydicarbonate (Percadox ® 16) | 0.5 parts |
| initiator #2: Tertiary-amyl peroxy 2-ethyl hexanoate in butyl benzyl phthalate (Esperax ® 570-P) | 0.63 parts |
| initiator #3: tert-butyl peroxybenzoate (Triqonox ® C) | 0.25 parts |
| internal mold release (Axel PS 125) | 0.95 parts |
| TOTAL | 128.33 parts |

The resin composition used for test panels 4, 5, & 6 was made of the base composition plus:

| | |
|---|---|
| HALS (Tinuvin ® 292 from Ciba-Geigy) | 1.0 parts |
| TOTAL | 129.33 parts |

The resin composition used for test panels 7, 8, & 9 was made of the base resin formulation plus:

| | |
|---|---|
| HALS (Tinuvin ® 292 from Ciba-Geigy) | 1.0 parts |
| UVA (Tinuvin ® 130 from Ciba-Geigy) | 1.0 parts |
| TOTAL | 130.33 parts |

Figure 2:
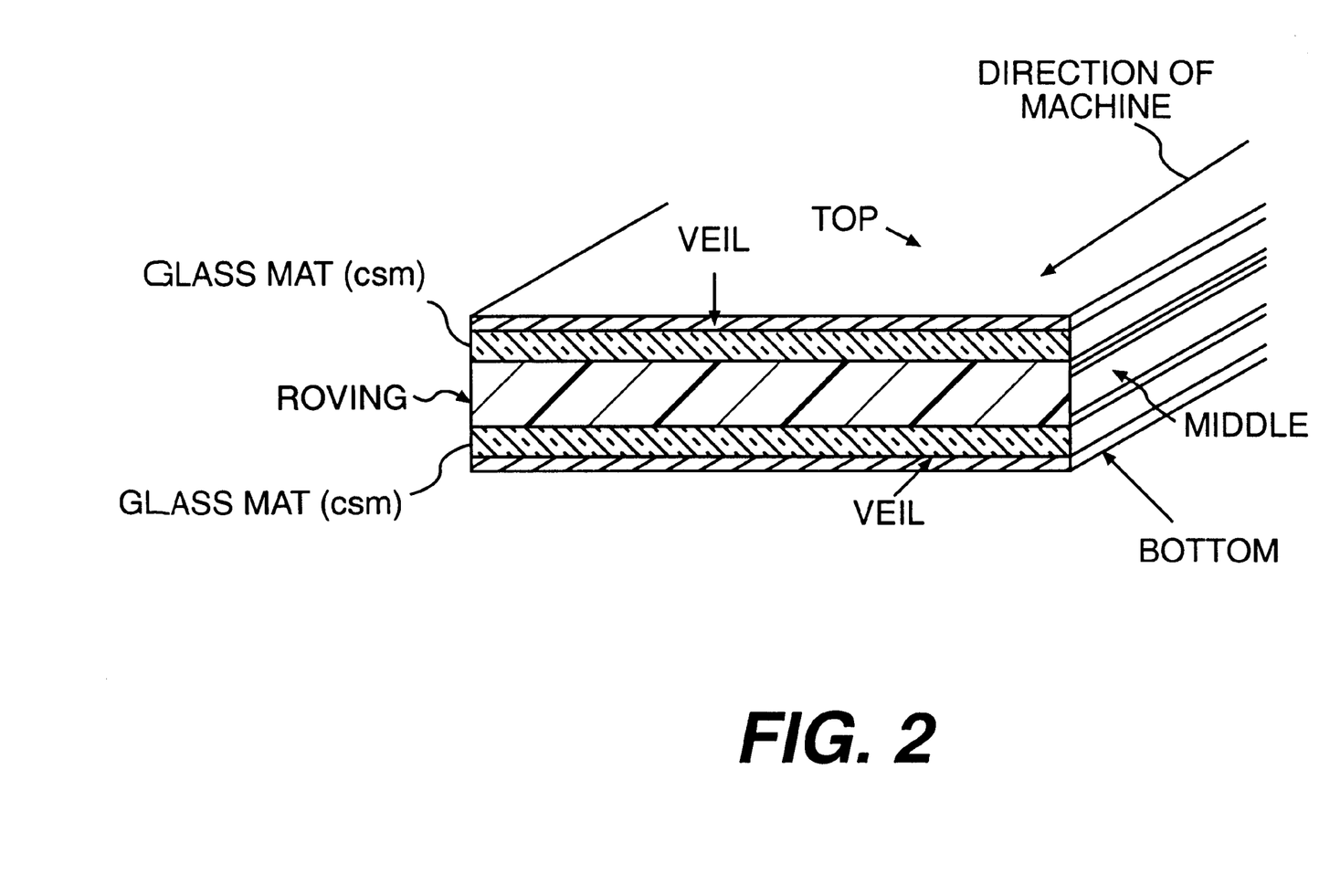
FIG. 2 is an embodiment of a panel produced according to the claimed invention.

The test panels were produced by a pultrusion process. The test panel fiberglass structure was of a layer of unidirectional rovings (90 ends of 13 yield roving from PPG, Inc.), sandwiched between two layers of 8 inch continuous strand glass mat @ 1.5 oz./ft.$^2$ (Owens-Corning CSM), for a total of three layers of reinforcement. The final structure in cross section can be seen in FIG. 2.

The pultrusion range was set up for a speed of 24 inches per minute. The pultrusion mold (for a 8' by 150 mil part) was 48 inches long by 18 inches wide by 4 inches thick. The mold entry temperature was 275° F., increasing to 300° F. at the cure zone (last 36 inches of the mold were heated).

Typically, the mat, rovings, and veils were guided off an arrangement of spools. The mat and rovings were passed through a pot of resin and guided to and through the mold entry. The two veils (e.g., untreated or treated veils as described above) were guided into the mold entry as the skin components right after the resin pot. The veils were saturated by the excess resin flow from the fiberglass as the fiberglass was squeezed by mold entry. The squeezed off resin was recycled into the pot. The resulting component was pulled through the mold as it underwent an exothermic thermoset cure, and exited the mold as a solid composite. A puller clamped the solid composite and continuously pulled it to produce an "infinite length" part out of the mold. The pultruded part was chopped to a desired length. The test panels produced were of a general composition of about 60% fiberglass by weight, and about 40% by weight of resin compound. The test panels were 8 inches wide and 150 mils thick.

The test panels were then exposed under a QUV test protocol (SAE J2020) : a cycle of 8 hours light at 70° C., and 100% relative umidity (R. H.), alternating with cycles of 4 hours dark at 50° C. and condensing humidity. ΔE, which is the net change in color from the initial value as measured on the L,a,b coordinate system, was recorded at the listed times. ΔE was determined using ASTM D 2244.

The following results were noted:

TABLE 1

QUV EXPOSURE OF PULTRUDED PANELS
COLOR (delta E)

| | TIME (hours) | | | | | | | |
|---|---|---|---|---|---|---|---|---|
| Run | 163 | 327 | 489 | 649 | 840 | 1000 | Veil | Resin |
| 1) | 3.98 | 5.54 | 6.64 | 7.99 | 9.28 | 9.83 | None | None |
| 2) | 0.29 | 0.81 | 1.49 | 2.12 | 2.97 | 3.57 | UVA | None |
| 3) | 0.77 | 1.28 | 1.78 | 2.56 | 3.16 | 3.30 | Comb. | None |
| 4) | 3.51 | 4.67 | 5.44 | 6.18 | 7.06 | 7.47 | None | HALS |
| 5) | 1.00 | 1.70 | 2.16 | 2.76 | 3.10 | 3.49 | UVA | HALS |
| 6) | 1.07 | 1.80 | 2.18 | 2.77 | 3.11 | 3.42 | Comb. | RALS |
| 7) | 0.37 | 0.85 | 1.22 | 1.59 | 1.91 | 2.11 | None | Comb. |
| 8) | 0.22 | 0.44 | 0.70 | 0.96 | 1.29 | 1.54 | UVA | Comb. |
| 9) | 0.19 | 0.51 | 0.92 | 1.19 | 1.54 | 1.80 | Comb. | Comb. |

EXAMPLE III

Using panels produced and exposed according to the procedure of Example II, the ΔYI between the panels initially and at the listed times was measured for each listed run. ΔYI is the net change in b color as measured on the L,a,b coordinate system. ΔYI was determined using ASTM D 1925-70. The following results were noted:

TABLE 2

QUV EXPOSURE OF PULTRUDED PANELS
DELTA YI

| Run | \multicolumn{6}{c}{TIME (hours)} | Veil | Resin |
|-----|-----|-----|-----|-----|-----|-----|-----|-----|
|     | 163 | 327 | 489 | 649 | 840 | 1000 |    |     |
| 1)  | 6.03  | 8.27 | 9.79 | 11.99 | 13.59 | 14.34 | None | None |
| 2)  | 1.70  | 2.69 | 3.65 | 4.54  | 5.74  | 6.60  | UVA  | None |
| 3)  | 0.89  | 1.64 | 2.34 | 3.46  | 4.31  | 4.50  | Comb. | None |
| 4)  | 4.87  | 6.53 | 7.59 | 8.70  | 9.97  | 10.58 | None | HALS |
| 5)  | 1.68  | 2.68 | 3.31 | 4.19  | 4.67  | 5.20  | UVA  | HALS |
| 6)  | 1.01  | 2.08 | 2.60 | 3.44  | 3.95  | 4.38  | Comb. | HALS |
| 7)  | 0.55  | 1.30 | 1.79 | 2.33  | 2.79  | 3.09  | None | Comb. |
| 8)  | −0.39 | 0.32 | 0.70 | 1.09  | 1.58  | 1.92  | UVA  | Comb. |
| 9)  | −0.52 | 0.02 | 0.62 | 1.01  | 1.53  | 1.90  | Comb. | Comb. |

EXAMPLE IV

Nine panels were produced in accordance with the procedures of Example II. Each panel was exposed under a Xenon exposure protocol (SAE J1960): a cycle of 40 minutes of light, followed by a cycle of 20 minutes of light and front spray, followed by a cycle of 60 minutes of light, followed by a cycle of 60 minutes of dark and rear spray. $\Delta E$ was recorded at the listed times. $\Delta E$ is the net change in color from the initial value as measured on the L,a,b coordinate system. $\Delta E$ was determined using ASTM D 2244. The following results were noted:

TABLE 3

XENON EXPOSURE OF PULTRUDED PANELS
COLOR (delta E)

| Run | \multicolumn{6}{c}{TIME (hours)} | Veil | Resin |
|-----|-----|-----|-----|-----|-----|-----|-----|-----|
|     | 161 | 320 | 485 | 644 | 790 | 993 |     |     |
| 1) | 7.03 | 9.20  | 11.30 | 12.23 | 11.30 | 11.25 | None  | None |
| 2) | 4.30 | 6.11  | 7.41  | 7.94  | 7.67  | 6.54  | UVA   | None |
| 3) | 4.57 | 6.17  | 7.36  | 7.91  | 7.49  | 6.14  | Comb. | None |
| 4) | 7.87 | 10.03 | 11.33 | 12.52 | 11.98 | 11.42 | None  | HALS |
| 5) | 5.63 | 6.94  | 7.63  | 9.27  | 8.81  | 7.99  | UVA   | HALS |
| 6) | 5.50 | 4.84  | 6.42  | 8.70  | 8.35  | 7.46  | Comb. | HALS |
| 7) | 4.48 | 5.73  | 6.53  | 7.39  | 7.87  | 6.57  | None  | Comb. |
| 8) | 4.24 | 4.73  | 5.33  | 5.76  | 5.97  | 4.80  | UVA   | Comb. |
| 9) | 3.80 | 4.14  | 5.24  | 5.68  | 6.63  | 5.46  | Comb. | Comb. |

EXAMPLE V

Panels were produced according to the procedure of Example II, and exposed according to the procedure of Example IV. The $\Delta YI$ between the panels initially and at the listed times was measured for each listed run. $\Delta YI$ is the net change in b color as measured on the L,a,b coordinate system. $\Delta YI$ was determined using ASTM D 1925-70. The following results were noted:

TABLE 4

XENON EXPOSURE OF PULTRUDED PANELS
DELTA YI

| Run | \multicolumn{6}{c}{TIME (hours)} | Veil | Resin |
|-----|-----|-----|-----|-----|-----|-----|-----|-----|
|     | 161 | 320 | 485 | 644 | 790 | 993 |     |     |
| 1) | 9.61  | 12.79 | 15.36 | 17.16 | 15.57 | 15.89 | None  | None |
| 2) | 4.43  | 7.09  | 9.28  | 10.95 | 9.64  | 9.05  | UVA   | None |
| 3) | 4.05  | 6.87  | 8.49  | 10.86 | 9.27  | 8.43  | Comb. | None |
| 4) | 10.02 | 13.41 | 15.30 | 17.54 | 16.38 | 16.01 | None  | HALS |
| 5) | 5.47  | 8.05  | 9.84  | 12.70 | 11.48 | 11.04 | UVA   | HALS |
| 6) | 5.26  | 6.29  | 8.52  | 11.93 | 10.97 | 10.29 | Comb. | HALS |
| 7) | 3.73  | 5.97  | 7.76  | 10.19 | 10.04 | 9.05  | None  | Comb. |
| 8) | 2.89  | 4.58  | 5.80  | 7.77  | 7.30  | 6.42  | UVA   | Comb. |
| 9) | 2.96  | 4.34  | 5.78  | 7.79  | 8.22  | 7.45  | Comb. | Comb. |

From these experimental results, it can be seen that inclusion of UV absorbers and/or stabilizers in the veils offers improved performance over inclusion of UV absorbers and/or stabilizers in the resin alone.

For example, in Example II, Table 1, the averages for delta E at 1000 hours of QUV exposure were:

none=6.47

UVA=2.87

Comb.=2.84, or a roughly 50% reduction in delta E due to use of treated veils versus untreated veils, regardless of inclusion of UVA or UV absorbers in the resin. Additionally, in Example V, Table 4, the averages for delta YI at 993 hours of Xenon exposure were:

none=13.65

UVA=8.84

Comb.=8.72, or a roughly 35% reduction in delta YI, regardless of inclusion of UVA or UV absorbers in the resin. These results are unexpected and surprising, given the state of the art.

The principles, preferred embodiments and modes of operation of the present invention have been described in the foregoing application. The invention, which is intended to be protected herein, is not to be construed as limited to the particulars disclosed, since these are to be regarded as illustrative rather than restrictive. For example, it is contemplated that in addition to a mold release agent, UV stabilizers and UV absorbers, other chemicals such as a fire retardant could be used in the process with the result that the resin in proximity to the veil would possess the advantageous properties of enhanced fire retardancy, etc., thereby mitigating the need for the addition of these expensive chemicals in large amounts to the resin itself. Other variations and changes may be made by those skilled in the art, without departing from the spirit of the invention.

The objects and advantages of the invention may be realized and obtained by means of the instrumentalities and combinations particularly pointed out in the appended claims.

What is claimed is:

1. A process for selectively delivering a composition effective to alter a chemical or physical property of a resin during a production process comprising the steps of:
   (a) treating a veil with at least one compound selected from a mold release agent, an ultraviolet stabilizer, an ultraviolet absorber, a cure promoter, or combinations thereof capable of altering at least one chemical or physical property of the resin;
   (b) applying the treated veil to the resin whereby said compound leaches from the treated veil into the resin permeating and surrounding the treated veil in an amount effective to alter at least one chemical or physical property of the resain;

(c) forming an article from the resin and the veil; and (d) curing the article.

2. The process according to claim 1, wherein the treated veil is applied to a surface of the resin.

3. The process according to claim 1, wherein said treating step is froth finishing; foam coating—stabilized system; coating of a thickened paste with knife, screen, or gravure applicator; printing of a thickened paste; using a vacuum extraction—low wet pick-up finishing system; using a steam box application; using a spray finishing—low wet pick-up; horizontal pad; or using a kiss roll applicator.

4. The process according to claim 1, wherein said compound is a mold release agent.

5. The process according to claim 4, wherein the mold release agent is, alone or in combination: alcohol phosphates and salts thereof; compositions of organic acid derivatives, organic phosphate esters and modified fatty acids; blends of synthetic resin, organic esters and co-polymers of fatty acid derivatives; aqueous emulsions of glycerides and organic acid derivatives with wetting agents; aqueous emulsions of a condensation product of synthetic resins, glycerides and organic acid derivatives with wetting agents; mixtures of primary, secondary fatty amines with copolymers of organic phosphate esters and fatty acids; aqueous emulsions of organic acid derivatives with wetting agents.

6. The process according to claim 1, wherein said compound is an ultraviolet absorber and/or stabilizer.

7. The process according to claim 6, wherein the ultraviolet absorber is, alone or in combination: 2(2'-hydroxy-5-methyl phenyl) benzotriazole , 2-(3'-tert butyl-2'-hydroxy-5'methyl phenyl)-5-chlorobenzotriazole, or a mixture of Poly(oxy-1,2-ethanediyl)-α-[3-[3-(2H-benzotriazol-2-yl)-5-(1,1-dimethylethyl)-4-hydroxyphenyl]-1-oxopropyl]-ω-[3-[3-(2H-benzotriazol-2-yl)-5-(1,1-dimethylethyl)-4-hydroxyphenyl]-1-oxopropoxyl] with Poly(oxy-1,2-ethanediyl)-α-[3-[3-(2H-benzotriazol-2-yl)-5-(1,1-dimethylethyl)-4-hydroxyphenyl]-1-oxopropyl]-ω-hydroxy-polyethylene glycol.

8. The process according to claim 6, wherein the ultraviolet stabilizer is: a mixture of bis(1,2,2,6,6-pentamethyl-4-piperidinyl)sebacate and methyl 1,2,2,6,6-pentamethyl-4-piperidinyl sebacate.

9. The process according to claim 1, wherein the process of applying the treated veil to the resin is pultrusion, contact molding, open molding, resin transfer molding, reaction injection molding, compression molding or continuous panel process.

10. The process according to claim 1, wherein the veil is polyester fabric, nylon spunbond fabric, glass fabric, aramid fabric or rayon fabric.

11. The process according to claim 1, wherein the veil is a woven, knit, or non-woven veil.

12. The process according to claim 1, wherein the resin is a polyester resin, an epoxy resin, a vinyl ester resin or a phenolic resin.

13. The process according to claim 1, wherein the resin contains a reinforcement.

14. The process according to claim 13, wherein the reinforcement is fiberglass, carbon or aramid.

15. The process according to claim 13, wherein the reinforcement is a mat, a woven product, or chopped or continuous rovings.

* * * * *